United States Patent [19]

Chavez, Jr.

[11] Patent Number: 6,058,305

[45] Date of Patent: May 2, 2000

[54] INCOMING CALL CONTROL FOR WIRELESS SETS

[75] Inventor: David Lee Chavez, Jr., Thornton, Colo.

[73] Assignee: Lucent Technologies Inc., Murray Hill, N.J.

[ * ] Notice: This patent is subject to a terminal disclaimer.

[21] Appl. No.: 08/582,566

[22] Filed: Jan. 3, 1996

[51] Int. Cl.[7] .................................................. H04Q 7/38
[52] U.S. Cl. ........................................ 455/426; 455/452
[58] Field of Search ................................ 455/417, 426, 455/434, 435, 445, 452, 453, 458, 464, 509, 510, 512, 513, 514, 515, 521, 524, 525

[56] References Cited

U.S. PATENT DOCUMENTS

| | | | |
|---|---|---|---|
| 5,202,912 | 4/1993 | Breeden et al. | 455/465 |
| 5,212,806 | 5/1993 | Natarajan | 455/525 |
| 5,222,123 | 6/1993 | Brown et al. | 455/417 |
| 5,226,071 | 7/1993 | Bolliger et al. | 455/435 |
| 5,311,570 | 5/1994 | Grimes et al. | 455/417 |
| 5,327,578 | 7/1994 | Breeden | 455/434 |
| 5,423,062 | 6/1995 | Sakakura | 455/434 |
| 5,428,663 | 6/1995 | Grimes et al. | 455/31.2 |
| 5,574,973 | 11/1996 | Borth et al. | 455/435 |
| 5,615,249 | 3/1997 | Solondz | 455/450 |

*Primary Examiner*—Dwayne D. Bost
*Assistant Examiner*—Myron K. Wyche
*Attorney, Agent, or Firm*—John C. Moran

[57] ABSTRACT

A PCS switching system and wireless set that allow the wireless set to control the processing of incoming calls regardless of whether the base station on which the wireless set is registered has capacity to complete a call to the wireless set. When an incoming call is received for a wireless set, a central computer providing overall control of the PCS system directs this call to a paging zone controller of a paging zone in which the wireless set is registered on a base station. If the base station does not have capacity to handle that call, the paging zone controller transmits a page pending message via the base station and a paging channel to the wireless set informing the wireless set that a page is pending and that the wireless set must find a base station with idle capacity. If the wireless set cannot find a base station with idle capacity within the paging zone, the wireless set transmits to the PCS switching system via the paging zone controller a page pending response message that specifies the operations that the PCS system is to perform with respect to the incoming call. The wireless set can specify the call coverage system to which the incoming call is to be routed. In addition, The wireless set can specify a message that will be given to the calling party of the incoming call by the call coverage system. The wireless set can specify that the incoming call is to be placed on hold until the wireless set can find a base station having call capacity to complete the incoming call to the wireless set.

32 Claims, 9 Drawing Sheets

INCOMING CALL CONTROL FOR WIRELESS SETS

TECHNICAL FIELD

This invention relates to personal communication service systems, and, in particular, to the control of incoming calls via a paging channel by wireless sets.

BACKGROUND OF THE INVENTION

Within the art, personal communication service (PCS) is provided in paging zones. The PCS switching system identifies each registered wireless set as being in a particular paging zone. When the PCS system receives an incoming call for a particular wireless set, the PCS system requests that all base stations within the paging zone of the wireless set transmit paging messages requesting that the wireless set identify itself with one of the base stations. Normally, a PCS base station can handle a limited number of wireless sets such as two to twelve active wireless sets at any given time. Since by their very nature, wireless sets are mobile, large concentrations of wireless sets may be present in a particular paging zone or within a portion of the paging zone served by only a few base stations. When this occurs, the wireless sets cannot make outgoing calls nor receive incoming calls. In addition, in these situations, the user of the wireless set has no control over how the PCS switching system will treat an incoming call that cannot be connected to a wireless set because of the lack of call capacity on the base stations that are presently serving the wireless set.

SUMMARY OF THE INVENTION

The foregoing problems are solved, and a technical advance in the art is achieved, by a PCS switching system and wireless set that allow the wireless set to control the processing of incoming calls regardless of whether the base station on which the wireless set is registered has capacity to complete a call to the wireless set. When an incoming call is received for a wireless set, a central computer providing overall control of the PCS system directs this call to a paging zone controller of a paging zone in which the wireless set is registered on a base station. If the base station does not have capacity to handle that call, the paging zone controller transmits a page pending message via the base station and a paging channel to the wireless set informing the wireless set that a page is pending and that the wireless set must find a base station with idle capacity. If the wireless set cannot find a base station with idle capacity within the paging zone, the wireless set transmits to the PCS switching system via the paging zone controller a page pending response message that specifies the operations that the PCS system is to perform with respect to the incoming call. Advantageously, the wireless set can specify in the page pending message the call coverage system to which the incoming call is to be routed. In addition, the page pending response message can define the message that will be given to the calling party of the incoming call by the call coverage system. Advantageously, the wireless set can specify in the page pending response message that the incoming call is to be placed on hold until the wireless set can find a base station having call capacity to complete the incoming call to the wireless set.

These and other advantages and features of the invention will become apparent from the following description of the illustrative embodiment of the invention taken together with the drawings.

DETAILED DESCRIPTION

Figure 1:
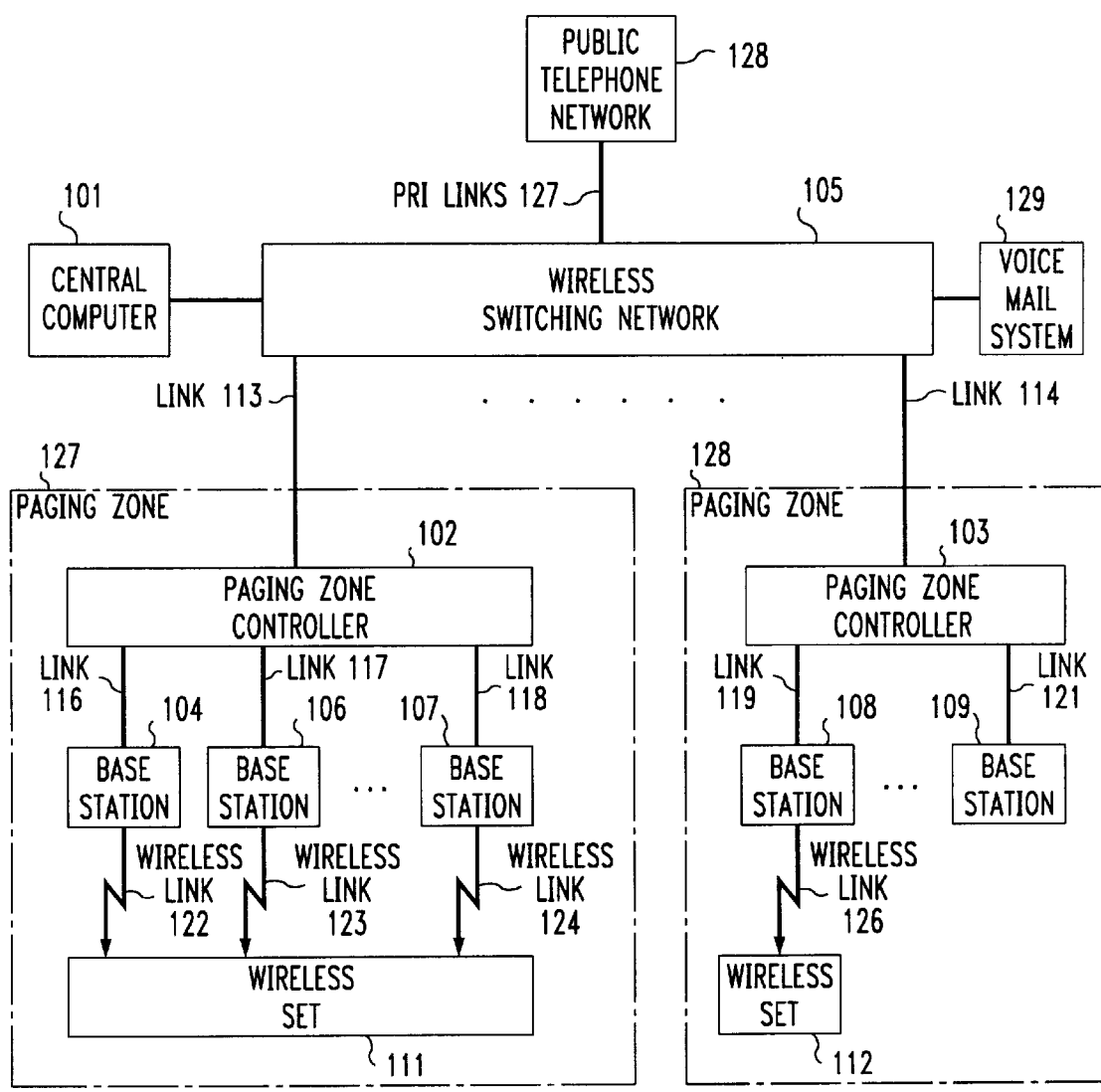
FIG. 1 illustrates, in block diagram form, an embodiment of the invention.

FIG. 1 illustrates a wireless switching system. Central computer 101 provides overall control of the wireless switching system, and switching network 105 interfaces the wireless switching system to public telephone network 128 via primary rate interface (PRI) links 127. Central computer 101 receives control information as ISDN messages from public telephone network 128 and paging zone controllers 102–103 via switching network 105. Each paging zone is controlled by a paging zone controller. For example, paging zone controller 102 controls paging zone 127. Paging zone controller 102 controls the base stations 104 through 107 within paging zone 127. Paging zone controller 102 communicates with central computer 101 via link 113. Link 113 may be a PRI link or other communication links. Paging zone controller 102 is interconnected to base station 104 via links 116 through 118. Each of these links may be one or more basic rate interface (BRI) links or a PRI link. The base stations communicate with wireless sets such as wireless set 111 via wireless links 122 through 124. One air protocol that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The PHS protocol has a message set similar to the ISDN message set. Paging zone controller 103 communicates with central computer 101 via link 114. Further, paging zone controller 103 communicates with base stations 108 through 109 via links 119 through 121. As indicated in FIG. 1, there can be a plurality of paging zones each controlled by a paging zone controller. A wireless set, such as wireless set 111, is only registered on one base station at a time; however, the wireless links of FIG. 1 illustrate that the wireless set is receiving the paging channel from all of the base stations within a given paging zone. However, as a practical matter, the wireless set will only receive the paging channel with those base stations within radio range. The wireless set must be receiving the paging channel from the base station on which the wireless set is registered. If not, the wireless set must register on another base station.

To understand the operation of the wireless switching system illustrated in FIG. 1, consider the following example. When wireless set 111 first comes into the paging zone controlled by paging zone controller 102, wireless set 111 registers on base station 104. During this registration, paging zone controller 102 informs central computer 101 that wireless set 111 is in paging zone 127. In addition, paging zone controller 102 marks wireless set 111 as being registered on base station 104. When an incoming call is received by central computer 101 via switching network 105 for wireless set 111, this call is routed via link 113 to paging zone controller 102. If base station 104 has idle talk channels in link 116 (B channels if link 116 is a PRI or BRI link), paging zone controller 102 completes the incoming call to wireless set 111 via base station 104. If there are not spare talk channels in link 116, paging zone controller 102 transmits a message to wireless set 111 via base station 104 informing wireless set 111 that there is an incoming call for the set and that the set must find a base station that has idle talk channel capacity on the link interconnecting the base station to paging zone controller 102. This message is referred to as a pending page message.

In response to the pending page message, wireless set 111 monitors for another base station within its radio range and in paging zone 127 which has idle capacity to handle this call. Each base station transmits its identity and idle call capacity on the paging channel periodically. If such a base station cannot be found, the wireless set notifies the user of the wireless set utilizing a display message, audio alert, or a vibration indicating that a call is pending but no base station within the paging zone and radio range has idle call capacity. In response to this alerting, the user selects how the incoming call will be handled by paging zone controller 102 and central computer 101 by entering information utilizing the keypad on the wireless set. The entered information is included in a page pending response message that is transmitted when wireless set 111 cannot determine immediately another base station in paging zone 127. The user can direct the incoming call to a call coverage system such as a secretary, secretarial pool, or to voice mail system 129. Again utilizing the keyboard in the case of a voice mail system 129, the user can specify the audio message that voice mail system 129 plays to the calling party when voice mail system 129 starts to record a message from the calling party. Advantageously, voice mail system 129 can play a message such as "Mr. Doe is unable to take your call at this time because of excessive PCS traffic, but he will return your call within five minutes". The ability to specify the greeting message that will be utilized by a voice mail system upon a call being transferred to the voice mail system is set forth in U.S. Pat. No. 5,434,906 which is hereby incorporated by reference.

In the page pending response message, the user can also designate that the incoming call be placed on hold until the user can find a base station either in the paging zone 127 or in another paging zone to which the incoming call can be completed to the wireless set. This operation is invoked by inserting the "seeking another base station" indication in the page pending response message. When this operation is specified in the page pending response message, the paging zone controller transmits a message to central computer 101 informing it that the wireless set is presently seeking another base station to which the incoming call can be completed. The user of the wireless set then moves to a base station which has the necessary call capacity, and the wireless set commences the registration process with this other base station. The initial registration message transmitted to the base station informs it that there is an incoming call pending; hence, it is not necessary for the wireless set to complete the total registration process. The paging zone controller in whose paging zone the wireless set has found a base station then informs central computer 101 that there is an incoming call presently on hold for this wireless set. Central computer 101 completes the incoming call through the new paging zone controller and new base station to the wireless set. Note, at the initial reception of the page pending response message with the call hold indication, central computer 101 can utilize voice mail system 129 to play a message to the calling party of the incoming call to inform the calling party that there will be a delay before the call is answered.

Figure 2:
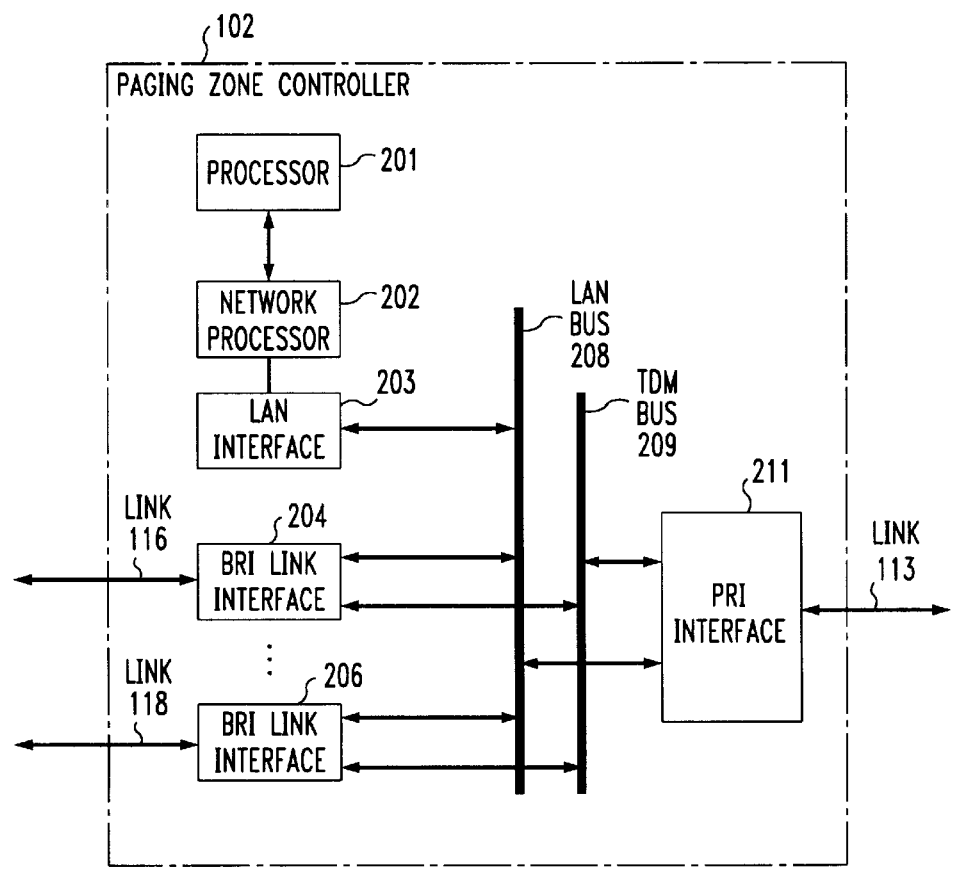
FIG. 2 illustrates, in block diagram form, the internal structure of a paging zone controller.

FIG. 2 illustrates in greater detail paging zone controller 102. As illustrated in FIG. 2, link 113 interfaces paging zone controller 102 to central computer 101 via switching network 105 is a PRI link that is terminated within paging zone controller 102 by PRI interface 211. Links 116–118 that interconnect paging zone controller 102 to base stations 104–107 are illustrated as being a single BRI link each terminated within paging zone controller 102 by a BRI link interface such as BRI interface 204. Each BRI link has two B channels which allows each base station to have two active calls and a D signaling channel for communicating control information. If the base stations can have more than two active calls at any one time, additional BRI links can be utilized to each base station or a PRI link can be utilized.

Voice connections are made between switching network 105 and a BRI link such as link 116 via BRI link interface 204, TDM bus 209, and PRI interface 211. PRI link interface 211 and BRI link interfaces 204–206 communicate information on TDM bus 209 in assigned time slots. PRI interface 211 communicates the information in the time slots to and from switching network 105 via link 113. Processor 201 via network processor 202, LAN interface 203 and LAN bus 208 controls the operation of the link interfaces by the transmission of signaling messages. The signaling messages are ISDN messages that are communicated via LAN bus 208, LAN interface 203, and network processor 201 to and from processor 201 with the link interfaces. For example, an incoming call is signaled by a setup message received by PRI interface 211. PRI interface 211 then transmits the setup message to processor 201 via LAN bus 208, LAN interface 203, and network processor 202. Similarly, processor 201 utilizes ISDN messages for signaling the base stations via network processor 202, LAN interface 203, LAN bus 208, and the BRI link interface to which the base station is interconnected.

Figure 3:
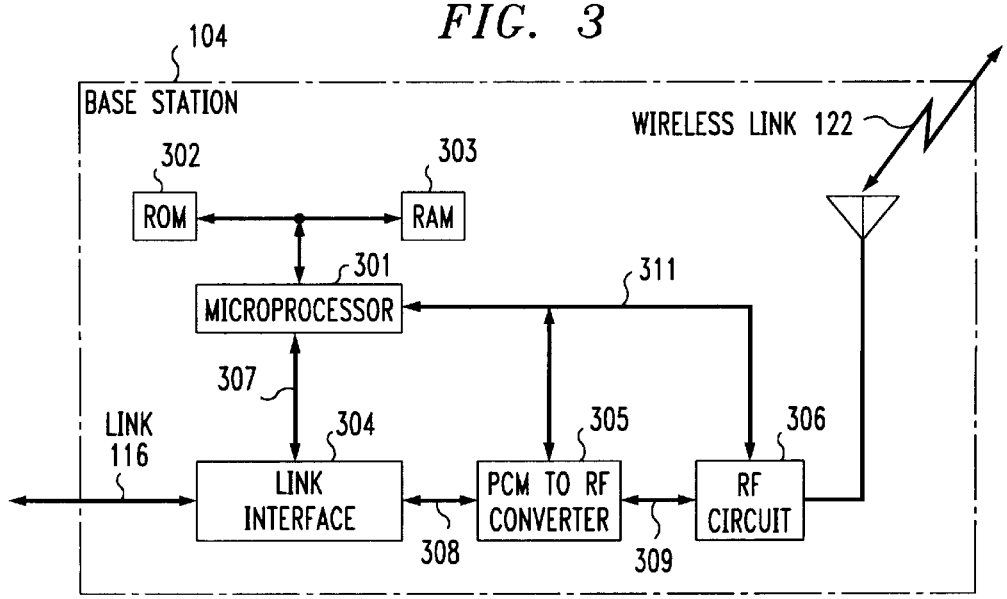
FIG. 3 illustrates, in block diagram form, the internal structure of a base station.

FIG. 3 illustrates in greater detail base station 104. Link interface 304 interfaces link 116 which interconnects base station 104 to BRI link interface 204 of FIG. 2. Link interface 304 is responsive to the B channels of link 116 to communicate these B channels via bus 308 with PCM to RF converter 305. This converter converts the PCM encoding on the B channels to the encoding utilized by the wireless sets. Further, link interface 304 communicates the D channel of link 116 to microprocessor 301. Microprocessor 301 is responsive to the messages being communicated with processor 201 of paging zone controller 102 to process these messages utilizing program and data stored in ROM 302 and RAM 303. Microprocessor 301 controls PCM to RF converter 305 and RF circuit 306 via bus 311. Microprocessor 301 transmits control messages for the wireless sets to PCM to RF converter 305 which converts these messages to the messaging protocol utilized by the wireless sets. RF circuit 306 maintains wireless links such as wireless link 122 with the wireless sets that are registered via base station 104.

Figure 4:
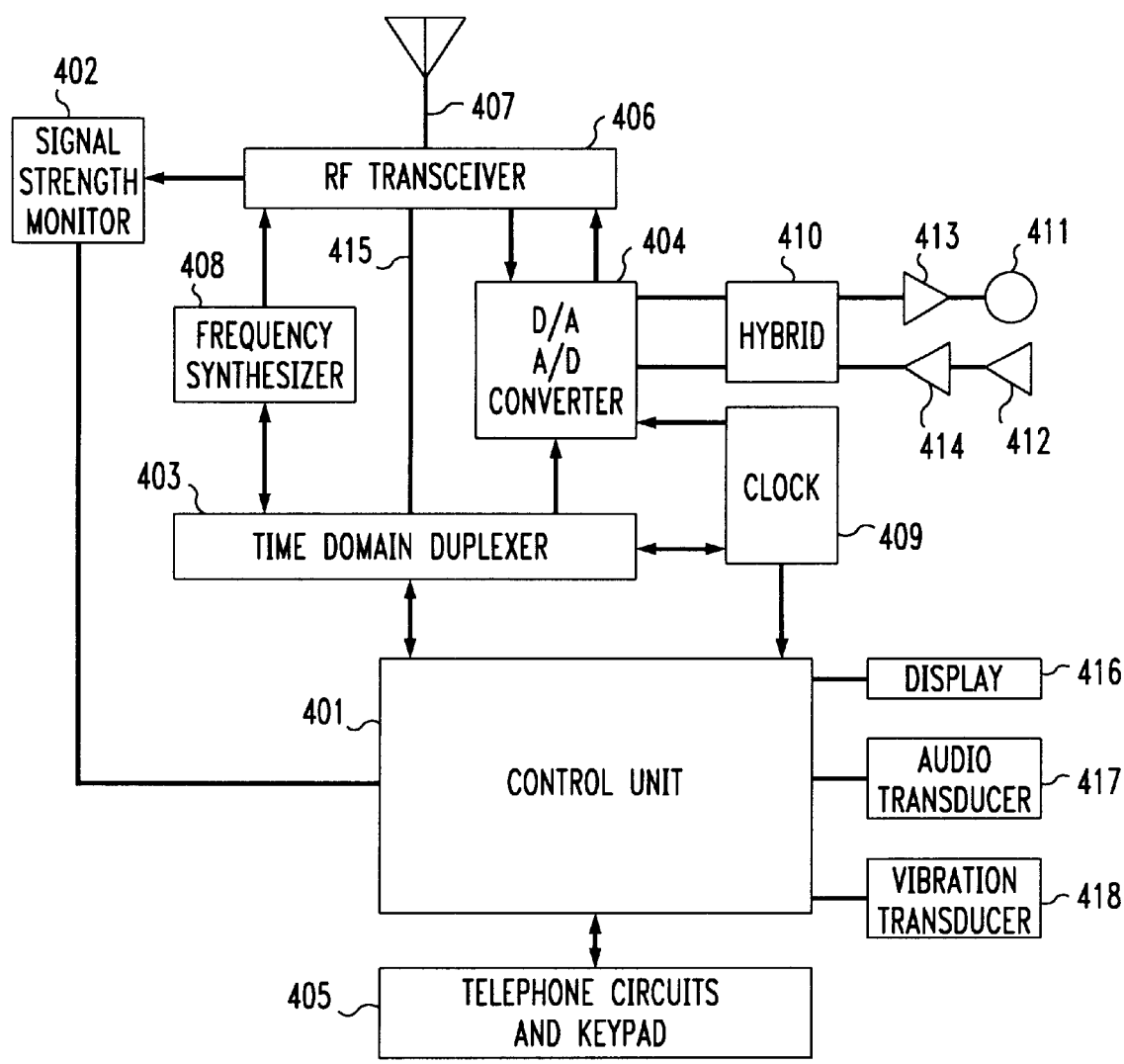
FIG. 4 illustrates, in block diagram form, the internal structure of a wireless set.

FIG. 4 illustrates wireless set 111 in greater detail. Components in this unit include control unit 401 and clock 409 for providing synchronization to: (1) control unit 401, (2) Time Domain Duplexer (TDD) 403, and (3) combined digital-to-analog and analog-to-digital (D/A+A/D) converter 404. Also included in wireless set 11 are RF transceiver 406, antenna 407 and frequency synthesizer 408. Telephone circuits and keypad section 405 permits dialing telephone digits and actuating control keys for placing and receiving telephone calls. Display 416, audio transducer 417, and vibration transducer 418 are utilized by control unit 401 to provide feedback to the user and to alert the user of various situations. The user is given the capability of muting audio transducer 417 in which case, control unit 401 will utilize vibration transducer 418 to alert the caller to incoming calls, etc.

Transceiver 406 comprises both an RF transmitter and an RF receiver. Transceiver 406 demodulates voice signals transmitted by a base station and couples these signals via the D/A section of converter 404 and hybrid 410 on to loudspeaker 412. Transceiver 406 receives its input analog speech signals from microphone 411. These analog speech signals are coupled to the transceiver via hybrid 410 and the A/D section of converter 404. Converter 404 converts the analog signals to digital signals which are then transmitted to RF transceiver 406. Conventional amplifiers 413 and 414 are employed for amplifying the analog speech signals obtained from microphone 411 and provided to loudspeaker 412. Control messages are transferred via time domain duplexer 403 to control unit 401.

FIGS. 5, 6, 7, and 10 illustrate the operations performed by a paging zone controller. Upon receipt of a message, decision block 501 determines if the message designates that there is an incoming call for a wireless set. This would normally be in the form of a setup message. If the answer is yes, block 503 determines if the base station on which the wireless set is registered has the call capacity to complete the call to the wireless set. If the answer is yes, block 502 processes the call in a normal manner. If the answer in decision block 503 is no, block 504 sends a pending page message to the wireless set via the base station on which the wireless set is presently registered. The pending page message informs the wireless set that it should find and reregister on a base station within the paging zone that has call capacity to allow the incoming call to be completed to the wireless set. After execution of block 504, decision block 506 determines if the wireless set has reregistered on another base station in the paging zone. If the answer is no, decision block 510 determines if a pending page response message was received. If the answer is yes, control is transferred to block 601 of FIG. 6. If the answer in decision block 510 is no, decision block 511 determines if the amount of time allowed for a wireless set to find another base station has elapsed. If the answer is no, control is transferred back to decision block 506. If the answer in decision block 511 is yes, block 512 sends a rejection message to central computer 101 before returning control back to decision block 501.

Figures 11, 12:
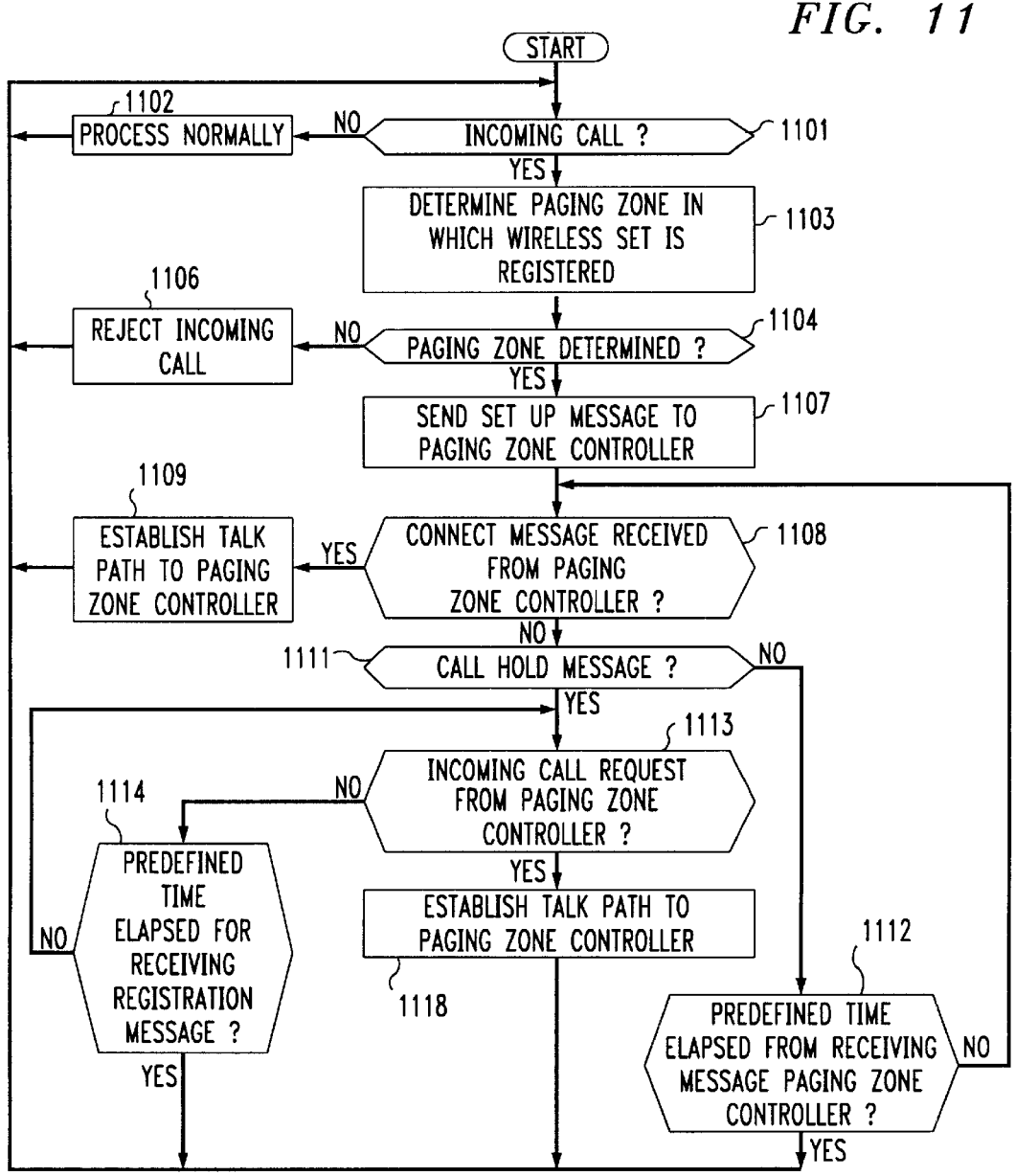
FIG. 11 illustrates the operations of a central computer.
FIG. 12 illustrates a status table.

Returning to decision block 506, if the answer in decision block 506 is yes, block 507 establishes the incoming call to the wireless set through the other base station. Block 508 then marks the wireless set as busy in the status table and registered on the other base station. The status table is illustrated in FIG. 12. Block 508 updates columns 1202–1204. Column 1201 already contains the identification of the wireless set. Finally, block 509 processes the incoming call in a normal manner.

Returning to decision block 501, if the answer in decision block 501 is no, control is transferred to decision block 513 which determines if the wireless set is placing an outgoing call. If the answer is yes, block 514 processes this call in a normal manner. If the answer in decision block 513 is no, control is transferred to block 701 of FIG. 7. Block 701 determines if a registration message has been received. If the answer in decision block 701 is yes, decision block 700 determines if a call hold indication is included in the registration message. If the answer is yes, control is transferred to decision block 1001 of FIG. 10. If the answer in decision block 700 is no, decision block 702 determines if a paging zone switch indication was included in the registration message. This indication is transmitted by the wireless set when the wireless set registers on a base station in a different zone from what the wireless set had been registered. If the answer is yes in decision block 702, block 703 processes the registration with central computer 101, and block 704 updates the status table to show that the wireless set is now registered on the base station in this paging zone. After execution of block 704, control is transferred back to decision block 501 of FIG. 5. Returning to decision block 702, if the answer is no, block 706 updates the status table to show that the wireless set is registered on a different base station. The paging zone switch indication defines to the paging zone controller that the wireless set has simply transferred from one base station to another base station within the paging zone. After execution of block 706, control is transferred back to block 501 of FIG. 5.

Returning to decision block 701, if the answer is no, control is transferred to decision block 707. The latter decision block determines if a predefined amount of time has elapsed for checking wireless set registrations. Since the paging zone controller receives no indication from central computer 101, when a wireless set shifts registration from the paging zone controller executing FIG. 7 to another paging zone controller, it is necessary for the paging zone controller to maintain a time dated list of the wireless set registrations in the status table. If the answer in decision block 707 indicates that some of the wireless sets have been registered but inactive for an amount of time exceeding the predefined amount, decision block 708 searches and removes the references to these wireless sets from the status table. After execution of block 708, block 709 processes any remaining messages in a normal manner before transferring control back to decision block 501 of FIG. 5. If the answer in decision block 707 is no, control is transferred to block 709 whose operations have just been described.

Figure 7:
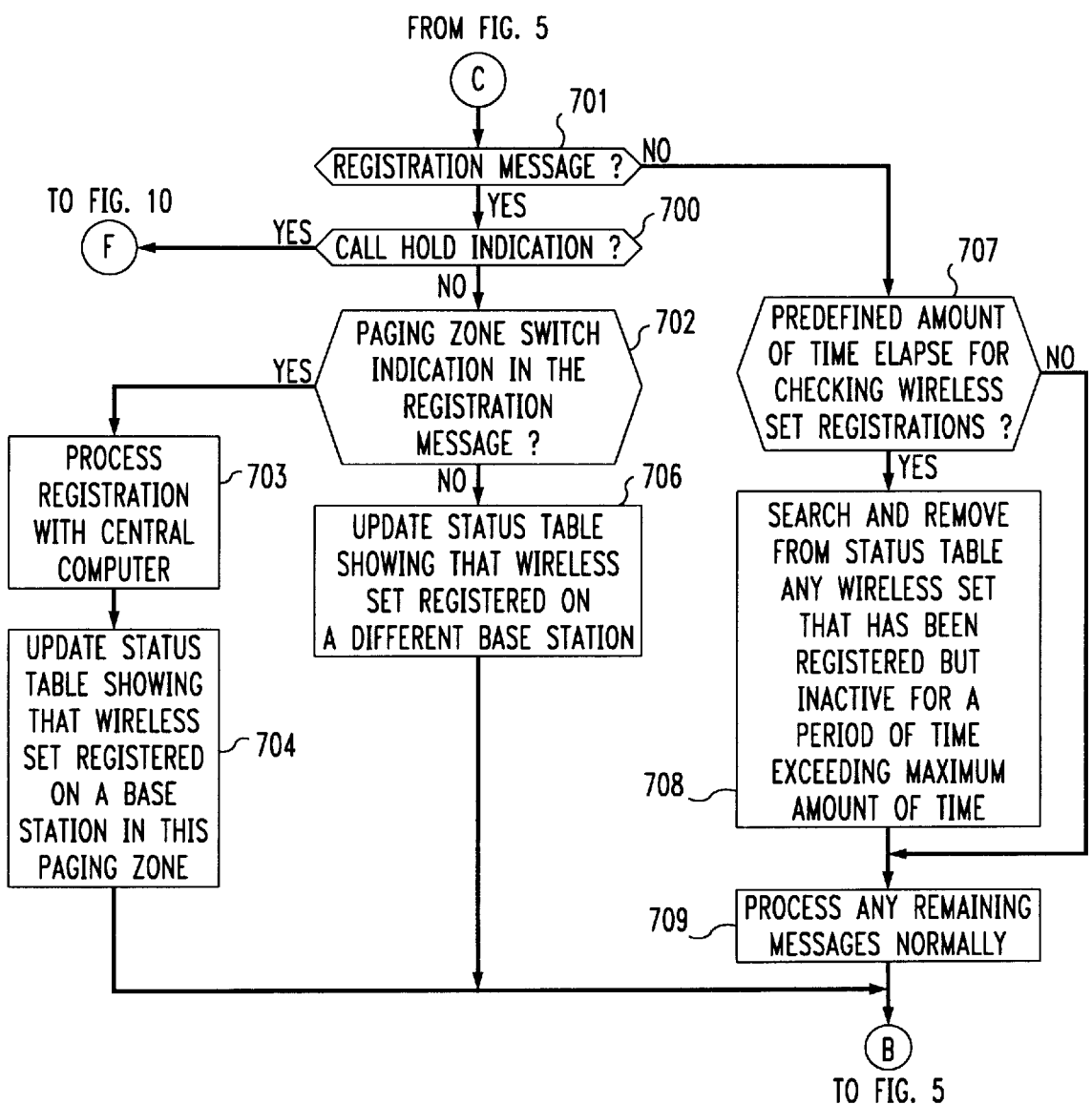
Figure 10:
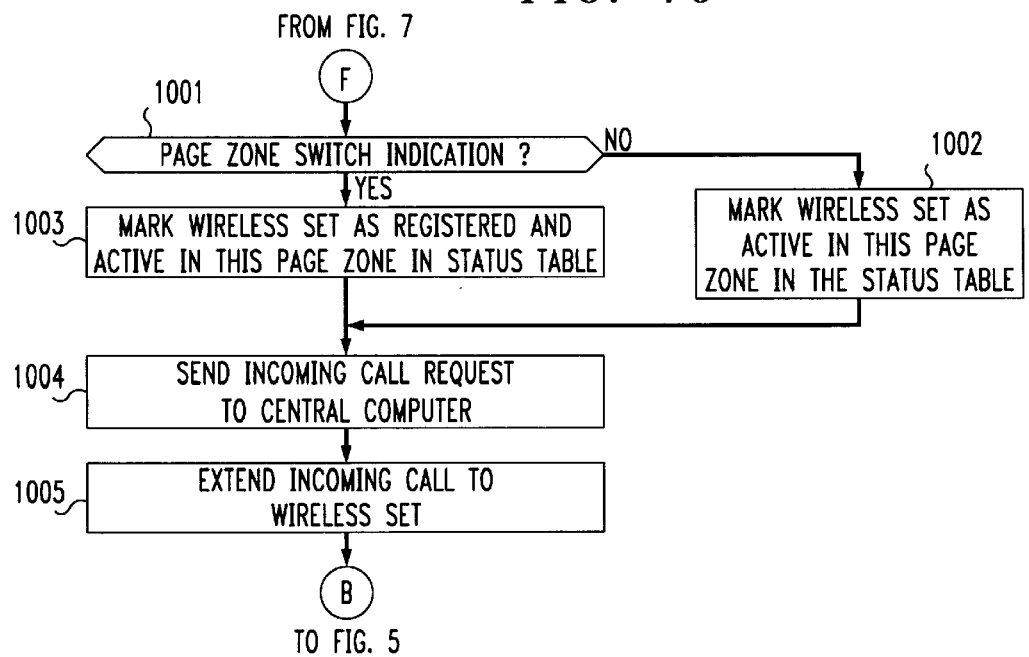

Returning to decision block 700 of FIG. 7, if the answer is yes, control is transferred to decision block 1001 of FIG. 10. Decision block 1001 determines if a page zone switch indication was also included in the registration message. If the answer is no, block 1002 marks the wireless set as active in this page zone in the status table since the wireless set has merely changed base stations within the paging zone. After execution of block 1002, control is transferred to 1004 which requests that the incoming call be transferred to this paging zone controller by central computer 101. When the incoming call is transferred to the paging zone controller, the paging zone controller extends this incoming call to the wireless set via the base station. Returning to decision block 1001, if there is a page zone switch indication in the registration message, block 1003 enters the wireless set as registered and active in this page zone in the status table. After execution of block 1003 control is transferred to block 1004 whose operations have already been described.

Figure 5:
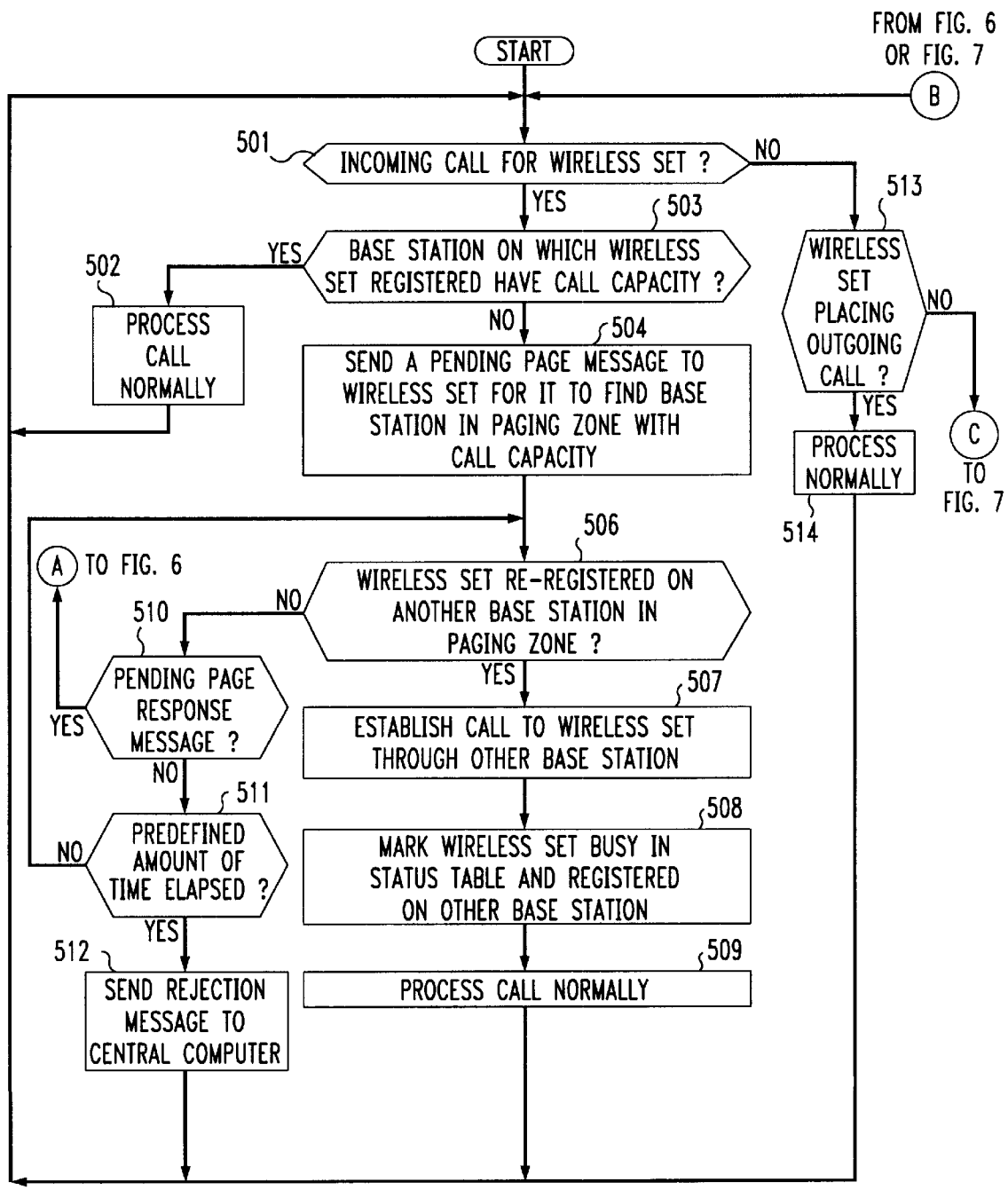
FIGS. 5, 6, 7, and 10 illustrate the operations of a paging zone controller.
Figure 6:
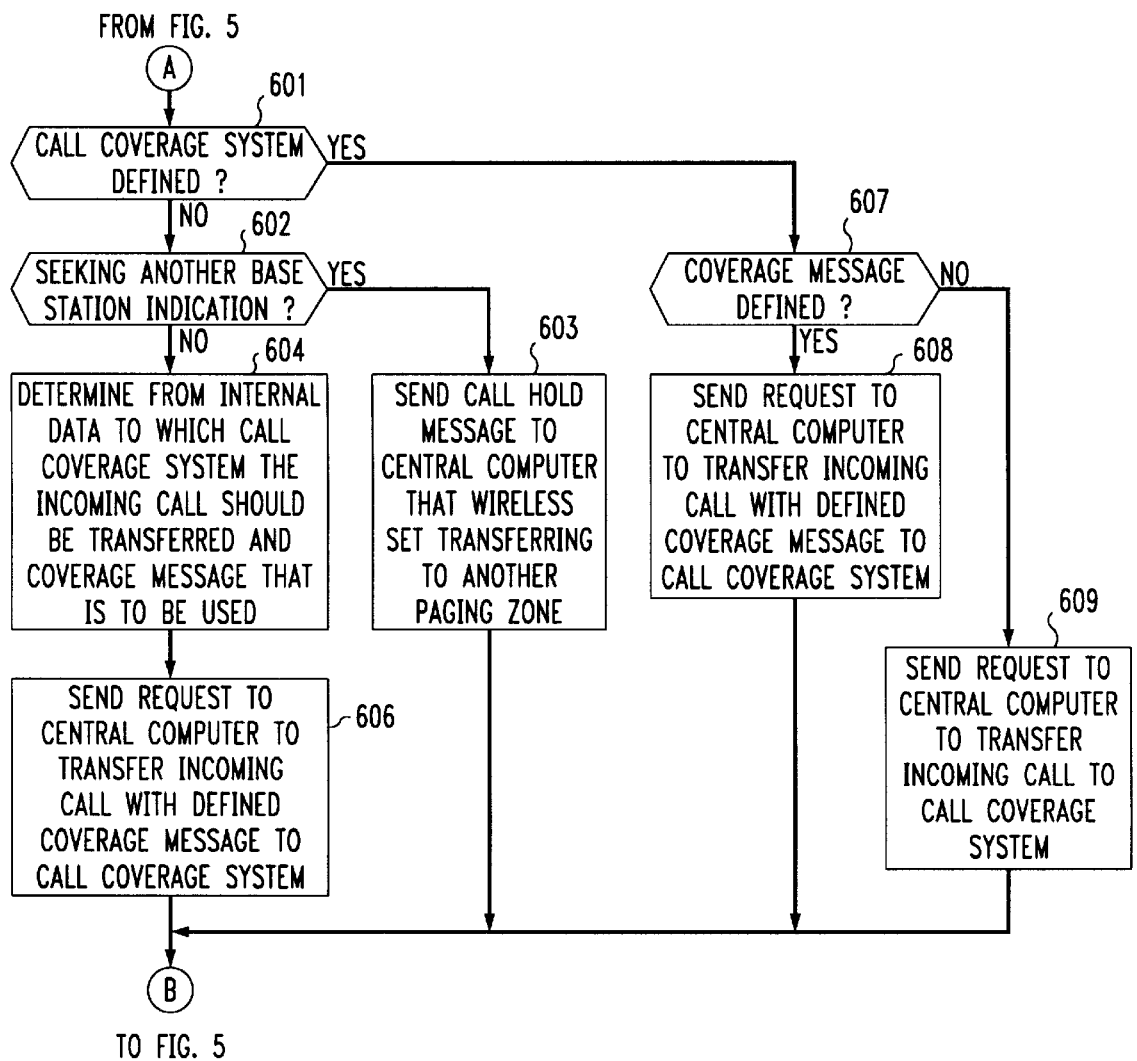

Returning to decision block 510 of FIG. 5, if there is a pending page response message, control is transferred to decision block 601 of FIG. 6. Decision block 601 determines if a call coverage system is defined in the pending page response message. If the answer is yes, decision block 607 determines if a coverage message is defined in the pending page response message. The coverage definition defines what message will be given to the calling party by the call coverage system. For example, if the call coverage system is voice mail system 129, the coverage message definition would define the audio message that the calling party would receive. If the answer in decision block 607 is yes, block 608 sends a request to the central computer causing the central computer to transfer the incoming call to the defined call coverage system and to request that the call coverage system utilize the defined coverage message in answering the calling party. After execution of block 608, control is transferred back to decision block 501 of FIG. 5. Returning to decision block 607, if the answer is no, block 609 sends a request to central computer 101 requesting that the incoming call be transferred to the defined call coverage system but does not define the coverage message. After execution of block 609, control is transferred to decision block 501 of FIG. 5.

Returning to decision block 601 of FIG. 6, if the answer is no, decision block 602 determines if the seeking another base station indication is in the page pending response message. This indication results in central computer 101 placing the call on hold until the wireless set finds a base station that has call capacity to allow the incoming call to be completed or a predefined amount of time expires. If the answer is yes in decision block 602, block 603 sends a call hold message to central computer 101 informing it that the wireless set is attempting to transfer to another base station and that the call should be placed on hold. After execution of block 603, control is transferred to decision block 501 of FIG. 5. Returning to decision block 602, if the answer is no, control is transferred to block 604. Using internal data stored in the paging zone controller, the latter block determines which call coverage system should be used to handle the incoming call and if a coverage message should be specified. Block 606 then transmits a request to central computer 101 defining the call coverage system and the defined coverage message if the message was specified. After execution of block 606, control is transferred back to decision block 501 of FIG. 5.

Figure 8:
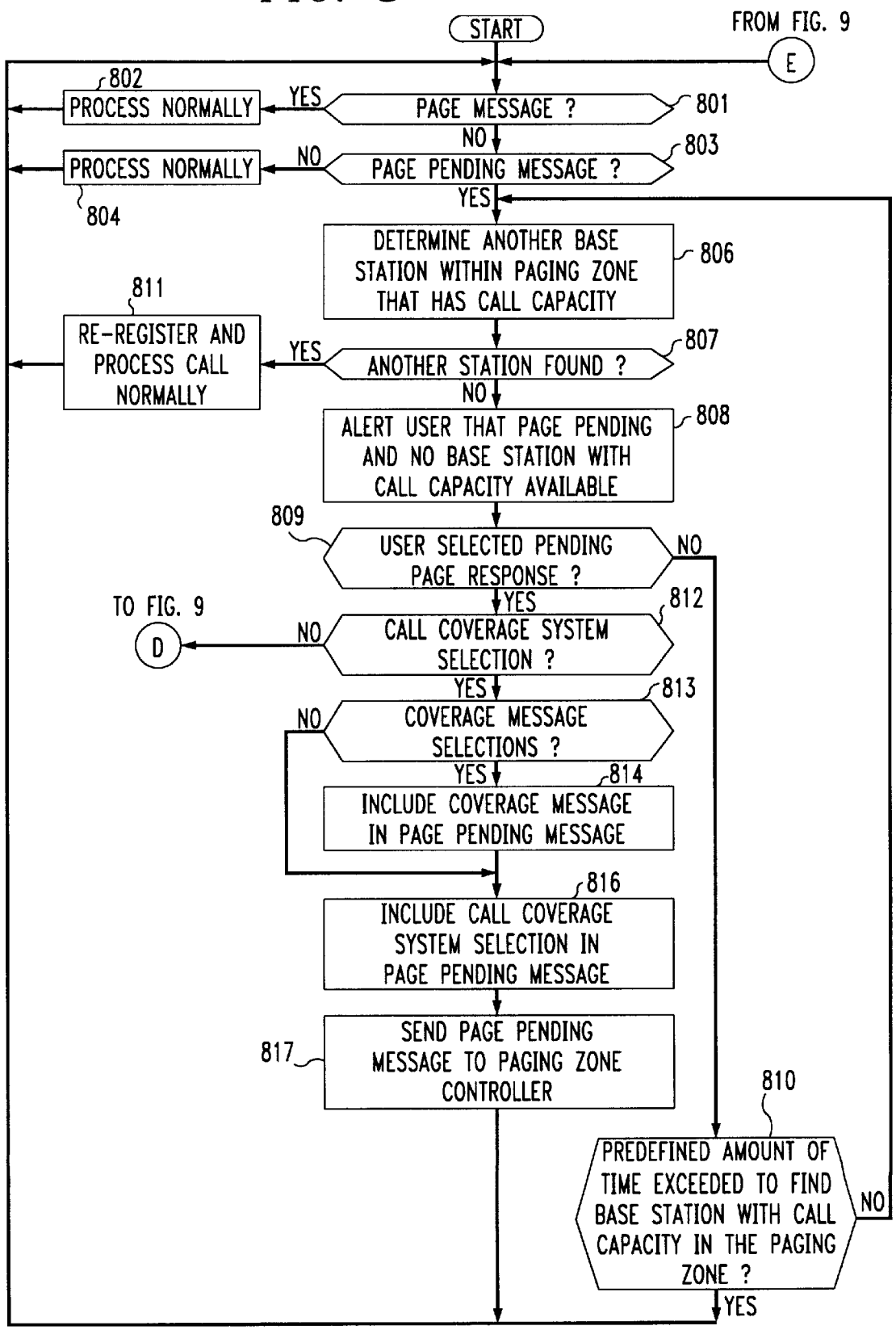
FIGS. 8 and 9 illustrate the operations of a wireless set.

FIG. 8 illustrates the operations performed by a wireless set with respect to paging. Decision block 801 determines if a page message has been received. If the answer is yes, block 802 processes the page message in a normal manner before returning control back to decision block 801. If the answer in decision block 801 is no, decision block 803 determines if a page pending message has been received. If the answer is no, block 804 processes the message or other stimulus in a normal manner before transferring control back to decision block 801.

If the answer in decision block 803 is yes, block 806 determines if another base station is present within the paging zone that has call capacity so that the incoming call can be completed to the wireless set. Decision block 807 determines if another base station was found. If the answer is yes, block 811 does the reregistration operation and processes the call in a normal manner before returning control back to decision block 801. If another base station was not found, control is transferred to block 808 which alerts the user that a page is pending and no base station with call capacity is available within the paging zone. After execution of block 808, decision block 809 determines if the user has selected to send a pending page response message to the paging zone controller via the base station. If the answer in decision block 809 is no, decision block 810 determines if the predefined amount of time that is allowed for a user to find another base station has been exceeded. Note, that in this situation the user must find the base station within the present paging zone. If the answer is no in decision block 811, control is transferred back to block 806. If the answer is yes in decision block 811, control is transferred back to decision block 801.

Returning to decision block 809, if the answer is yes, decision block 812 determines whether the user has indicated a call coverage selection by using the keypad on the wireless set. If the answer is no, control is transferred to decision block 901 of FIG. 9. If the answer in decision block 812 is yes, control is transferred to block 813 which determines if the user also wants to include a coverage message selection. If the answer is yes in decision block 813, block 814 includes the selected coverage message in the page pending message and transfers control to block 816. The latter block includes the call coverage system selection in the page pending message. Finally, block 817 transmits the page pending message to the paging controller before transferring control back to decision block 801. If the answer in decision block 813 was no, control is transferred to block 816 whose operations have already been described.

Figure 9:
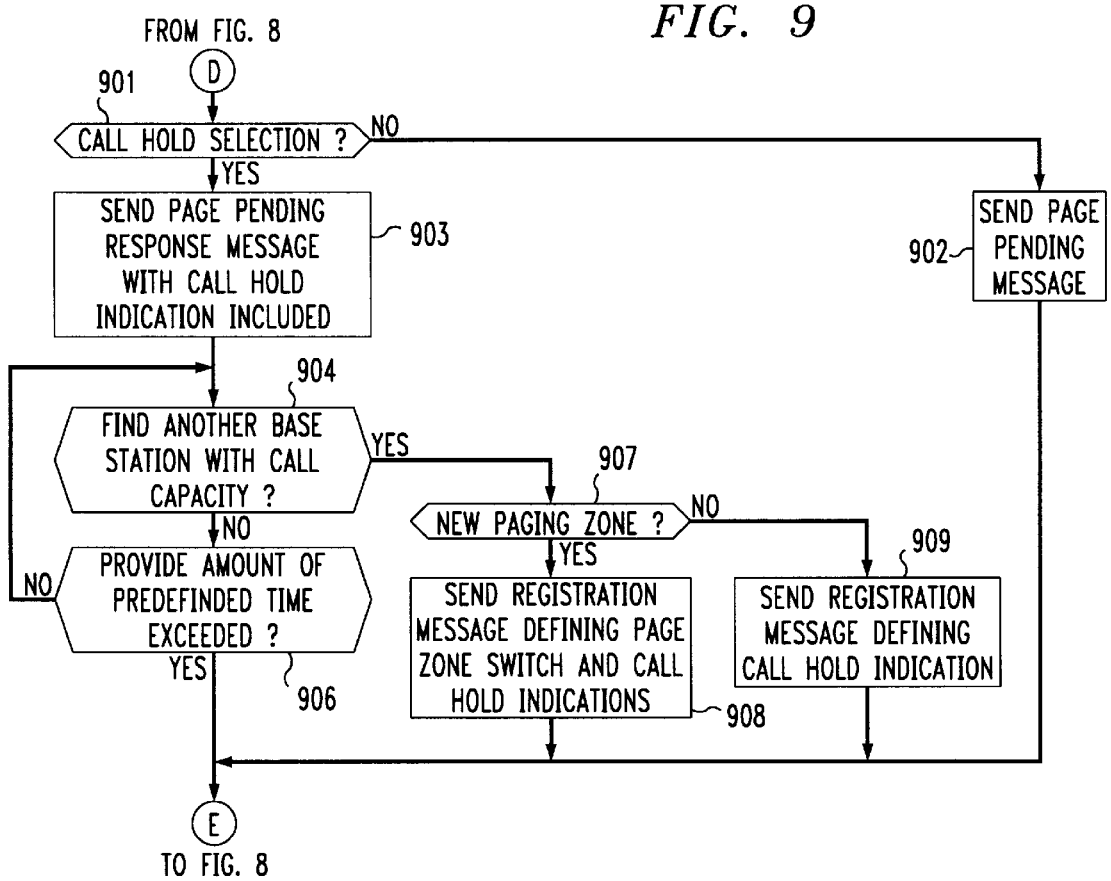

Returning to decision block 812, if the answer is no, control is transferred to decision block 901 of FIG. 9 which determines if the user has selected the call hold option. If the answer is no, block 902 sends a page pending message to the paging zone controller before transferring control back to decision block 801 of FIG. 8. Returning to decision block 901, if the answer is yes, block 903 sends a page pending response message to the paging zone controller that includes the seeking another base station indication and transfers control to decision block 904. Decision block 904 begins the search utilizing the paging channel to find a new base station with the necessary call capacity to allow the reception of the incoming call. The search performed in decision block 904 is not limited to the present paging zone. If another base station is not found, control is transferred to decision block 906 which determines if the amount of predefined time has been exceeded. This predefined amount of time advantageously may be two minutes. If the answer in decision block 906 is no, control is transferred back to decision block 904. If the answer in decision block 906 is yes, control is transferred back to decision block 801 of FIG. 8. Central computer 101 allows a similar amount of time for the incoming call to be removed from call hold. Returning to decision block 904, if another base station is found, control is transferred to decision block 907 which determines if the other base station is in a new paging zone. If the answer is no, block 909 transmits a registration message defining a call hold indication to the paging zone controller. The paging zone controller is responsive to this registration message to eliminate the normal registration procedure. After execution of block 909, control is transferred to decision block 801 of FIG. 8. If the answer in decision block 907 is yes, block 908 is executed which sends a registration message indicating a page zone switch and call hold to the paging zone controller. After execution of block 908, control is transferred back to decision block 801 of FIG. 8.

FIG. 11 illustrates the operations of central computer 101 with respect to an incoming call. Decision block 1101 determines if the stimulus being received by central computer 101 is an incoming call. If the answer is no, control is passed to block 1102 which processes this stimulus in a normal manner before control once again is passed to block 1101. If the answer in decision block 1101 is yes, block 1103 determines the paging zone in which the wireless set is registered. Decision block 1104 then decides if a paging zone has been determined. If the answer is no, block 1106 rejects the incoming call before returning to decision block 1101. If the answer in decision block 1104 is yes, block 1107 sends a setup message to the paging zone controller that is controlling the determined paging zone. Decision block 1108 determines if a connect message is received back from the paging zone controller. The paging zone controller sends back a connect message if it is possible to establish immediately the incoming call to the called wireless set in the paging zone controlled by the paging zone controller. If the answer in decision block 1108 is yes, block 1109 establishes a talk path to the paging zone controller which in turn establishes the path to the called wireless set via a base station. After execution of block 1109, control is returned to decision block 1101.

If the answer in decision block 1108 is no, decision block 1111 determines if a call hold message was received defining a call hold indication. If the answer is no, decision block 1112 determines if a predefined time has elapsed for receiving a message from the paging zone controller. This message can be either a connect message or a message. If the answer in decision block 1112 is no, control is transferred back to decision block 1108. If the answer in decision block 1112 is yes, control is transferred back to decision block 1101.

Returning to decision block 1111, if the answer is yes, decision block 1113 determines if an incoming call request has been received from a paging zone controller. A paging zone controller will transmit such a request when it receives a registration request from a wireless set defining a call hold condition. If the answer in decision block 1113 is no, decision block 1114 determines if a predefined amount of time has elapsed for receiving an incoming call message. This predefined amount of time is advantageously two minutes. If the answer in decision block 1114 is no, control is transferred back to decision block 1113. If the answer in decision block 1114 is yes, control is transferred back to decision block 1101. Returning to decision block 1113, if the answer is yes, control is transferred to block 1118 which establishes a talk path to the paging zone controller before transferring control back to decision block 1101.

It is to be understood that the above-described embodiments are merely illustrative of the principles of the invention and that other arrangements may be devised by those skilled in the art without departing from the spirit and scope of the invention.

What is claimed is:

1. A method for paging a plurality of wireless sets each registered on one of a plurality of base stations which are divided into sets with each set being interconnected to an individual one of a plurality of paging zone controllers with each of the paging zone controllers controlling one of a plurality of paging zones and each of the paging zone controllers being interconnected to a wireless switch, the method comprising the steps of:

receiving an incoming call for a first wireless set of the plurality of wireless sets by the wireless switch;

communicating the incoming call by the wireless switch to a first paging zone controller of the plurality of paging zone controllers controlling a first paging zone of the plurality of paging zones upon the first wireless set being registered on a first base station of a first set of base stations that are interconnected to the first paging zone controller;

routing the incoming call by the first paging zone controller to the first wireless set via the first base station upon the first base station having call capacity to handle the incoming call;

transmitting a first message to the first wireless set by the first paging zone controller via the first base station upon the first base station not having call capacity to handle the incoming call whereby the first message instructs the first wireless set to find and register on a second base station of the first set of base stations that has capacity to handle the incoming call; and receiving by the first paging zone controller a second message from the first wireless set via the first base station upon a second base station not being determined whereby the second message defines that the second base station was not determined.

2. The method of claim 1 further comprises the step of transmitting a third message to the wireless switch by the first paging zone controller upon the second message indicating that the incoming call is to be placed on hold until the first wireless set can find one of the plurality of base stations having call capacity by which the incoming call can be completed to the first wireless set.

3. The method of claim 2 further comprises the steps of registering by the first wireless set in response to transmission of the second message on a third base station of a second set of base stations controlled by a second paging zone controller of the plurality of paging zone controllers in a second paging zone of the plurality of paging zones;

registering the first base station with the wireless switch by the second paging zone controller; and extending the incoming call to the second paging zone controller by the wireless switch in response to the registration of the first wireless set and the third message.

4. The method of claim 3 further comprises the step of transmitting an audio message by the wireless switch to a calling party of the incoming call upon initial receipt of the third message whereby the audio message informs the calling party that the incoming call has been placed on hold.

5. The method of claim 1 further comprises the step of determining a type of call coverage system to which the incoming call is to be transferred by the first paging zone controller in response to the received second message and data stored in the first paging zone controller.

6. The method of claim 5 wherein the step of determining the type of call coverage system comprises the step of selecting a voice mail system by the first paging zone controller using the stored data.

7. The method of claim 6 wherein the step of selecting comprises the step of specifying a audio message to be played to a calling party of the incoming call by the first paging zone controller using the stored data.

8. The method of claim 1 further comprises the step of alerting by the first wireless set a user upon a second base station not being determined.

9. The method of claim 8 further comprises the step of determining a type of call coverage system to which the incoming call is to be transferred by the first paging zone controller as defined in the received second message.

10. The method of claim 9 wherein the step of determining the type of call coverage system comprises the step of selecting a voice mail system as defined in the received second message.

11. The method of claim 10 wherein the step of selecting comprises the step of specifying a audio message as defined in the received second message to be played to a calling party of the incoming call by the voice mail system.

12. A method for receiving incoming telephone calls by a wireless set via base stations, the method comprising the steps of:

receiving a first message from a base station on which the wireless set is registered whereby the first message indicates to the wireless set that the wireless set has an incoming telephone call and that the wireless set must find another base station having call capacity to complete the incoming call to the wireless set;

sending second message to the base station indicating inability of the wireless set to answer the incoming call upon another base station not being found and indicating in response to actions of the user the type of call coverage system to which the incoming call is to be transferred; and alerting by the wireless set a user upon another base station not being found.

13. The method of claim 12 wherein the step of indicating comprises the step of defining that the call coverage system is to be a voice mail system.

14. The method of claim 13 wherein the step of defining comprises the step of allowing the user to specify the voice message that the voice mail system will play to a calling party of the incoming call.

15. The method of claim 12 wherein the step of sending comprises the step of indicating in the second message in response to actions of the user that the incoming call is to placed on hold until the first wireless set can find another base station having call capacity by which the incoming call can be completed to the first wireless set.

16. The method of claim 15 further comprises the step of finding the other base station in response to the sending of the second message.

17. An apparatus for paging a plurality of wireless sets each registered on one of a plurality of base stations which are divided into sets with each set being interconnected to an individual one of a plurality of paging zone controllers with each of the paging zone controllers controlling one of a plurality of paging zones and each of the paging zone controllers being interconnected to a wireless switch, comprising:

means in the wireless switch for receiving an incoming call for a first wireless set of the plurality of wireless sets;

means in the wireless switch for communicating the incoming call to a first paging zone controller of the plurality of paging zone controllers controlling a first paging zone of the plurality of paging zones upon the first wireless set being registered on a first base station of a first set of base stations that are interconnected to the first paging zone controller;

means in the first paging zone controller for routing the incoming call to the first wireless set via the first base station upon the first base station having call capacity to handle the incoming call;

means in the first paging zone controller for transmitting a first message to the first wireless set via the first base station upon the first base station not having call capacity to handle the incoming call whereby the first message instructs the first wireless set to find and register on a second base station of the first set of base stations that has capacity to handle the incoming call; and means in the first paging zone controller for receiving a second message from the first wireless set via the first base station upon a second base station not being determined whereby the second message defines that the second base station was not determined.

18. The apparatus of claim 17 further comprises means in the first paging zone controller for transmitting a third message to the wireless switch upon the second message indicating that the incoming call is to be placed on hold until the first wireless set can find one of the plurality of base stations having call capacity by which the incoming call can be completed to the first wireless set.

19. The apparatus of claim 18 further comprises means in the first wireless set for registering in response to transmission of the second message on a third base station of a second set of base stations controlled by a second paging zone controller of the plurality of paging zone controllers in a second paging zone of the plurality of paging zones;

means in the second paging zone controller for registering the first base station with the wireless switch; and means in the wireless switch for extending the incoming call to the second paging zone controller in response to the registration of the first wireless set and the third message.

20. The apparatus of claim 19 further comprises means in the wireless switch for transmitting an audio message to a calling party of the incoming call upon initial receipt of the third message whereby the audio message informs the calling party that the incoming call has been placed on hold.

21. The apparatus of claim 17 further comprises means in the first paging zone controller for determining a type of call coverage system to which the incoming call is to be transferred in response to the received second message and data stored in the first paging zone controller.

22. The apparatus of claim 21 wherein the means for determining the type of call coverage system comprises means in the first paging zone controller for selecting a voice mail system using the stored data.

23. The apparatus of claim 22 wherein the means for selecting comprises means in the first paging zone controller for specifying a audio message to be played to a calling party of the incoming call using the stored data.

24. The apparatus of claim 17 further comprises means in the first wireless set for alerting a user upon a second base station not being determined.

25. The apparatus of claim 24 further comprises means in the first paging zone controller for determining a type of call coverage system to which the incoming call is to be transferred as defined in the received second message.

26. The apparatus of claim 25 wherein the means for determining the type of call coverage system comprises means for selecting a voice mail system as defined in the received second message.

27. The apparatus of claim 26 wherein the means for selecting comprises means for specifying a audio message as defined in the received second message to be played to a calling party of the incoming call by the voice mail system.

28. A wireless set for receiving incoming telephone calls via base stations, comprising:

means for receiving a first message from a base station on which the wireless set is registered whereby the first message indicates to the wireless set that the wireless set has an incoming telephone call and that the wireless set must find another base station having call capacity to complete the incoming call to the wireless set;

means for sending second message to the base station indicating inability of the wireless set to answer the incoming call and indicating in response to actions of the user the type of call coverage system to which the incoming call is to be transferred upon another base station not being found; and means for alerting a user upon another base station not being found.

29. The apparatus of claim 28 wherein the means for indicating comprises means for defining that the call coverage system is to be a voice mail system.

30. The apparatus of claim 29 wherein the means for defining comprises means for allowing the user to specify the voice message that the voice mail system will play to a calling party of the incoming call.

31. The apparatus of claim 28 wherein the means for sending comprises means for indicating in the second message in response to actions of the user that the incoming call is to placed on hold until the first wireless set can find another base station having call capacity by which the incoming call can be completed to the first wireless set.

32. The apparatus of claim 31 further comprises means for finding the other base station in response to the sending of the second message.

* * * * *